United States Patent
Wang et al.

(10) Patent No.: US 10,110,772 B2
(45) Date of Patent: Oct. 23, 2018

(54) SYSTEM AND METHOD OF DETERMINING IF USERS CAN FIX OR REPAIR MFP ERRORS IN A PRINTING SYSTEM

(71) Applicant: KONICA MINOLTA LABORATORY U.S.A., INC., San Mateo, CA (US)

(72) Inventors: Eddie Wang, San Jose, CA (US); Eric Lee, San Jose, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 15/070,496

(22) Filed: Mar. 15, 2016

(65) Prior Publication Data
US 2017/0272606 A1  Sep. 21, 2017

(51) Int. Cl.
*H04N 1/32* (2006.01)
*H04N 1/00* (2006.01)
*G06F 3/12* (2006.01)

(52) U.S. Cl.
CPC ......... *H04N 1/32609* (2013.01); *G06F 3/121* (2013.01); *G06F 3/1234* (2013.01); *G06F 3/1261* (2013.01); *G06F 3/1273* (2013.01); *G06F 3/1275* (2013.01); *H04N 1/00344* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2002/0097429 A1* | 7/2002 | Ferlitsch | ................. | G06F 3/121 358/1.15 |
| 2004/0100650 A1* | 5/2004 | Landau | ................... | H04L 41/22 358/1.14 |
| 2007/0273913 A1* | 11/2007 | Nakata | ................. | G06F 21/608 358/1.14 |
| 2010/0178067 A1* | 7/2010 | Azami | ............... | G03G 15/6508 399/16 |
| 2012/0150920 A1* | 6/2012 | Roulland | .......... | G06F 17/30011 707/805 |
| 2013/0227358 A1* | 8/2013 | Yokokura | ........... | G06F 11/0733 714/57 |
| 2013/0258377 A1* | 10/2013 | Armstrong | .............. | G06F 3/121 358/1.13 |

FOREIGN PATENT DOCUMENTS

| | | |
|---|---|---|
| JP | 2005-172902 A | 6/2005 |
| JP | 2010-026317 A | 2/2010 |

OTHER PUBLICATIONS

Translation for JP 2005-172902.*

* cited by examiner

*Primary Examiner* — Lennin Rodriguezgonzalez
(74) *Attorney, Agent, or Firm* — Buchanan Ingersoll & Rooney PC

(57) ABSTRACT

A method, a system, a server, and a computer readable medium are disclosed for a server connectable to at least one printer to judge an error level, which includes (a) receiving a notification of a given error which has occurred at a given printer; (b) judging on whether there is an unfinished job corresponding to the given printer; (c) judging on whether the unfinished job can be redirected to other printer than the given printer; and (d) determining an error level for displaying the given error based on the judgment at step (c).

20 Claims, 16 Drawing Sheets

Error Code : a21 (Level 1) or a26 (Level 2)

Please call to a service person

Fig. 7A

Error Code : a21 (Level 2) or a20 (Level 1)

Instruction a21 (Level 2) or a20 (Level 1)
(1)....
(2)....
(3)....
(4)....
.........
.........
.........

Fig. 7B

Printer_a

| Error Content | Level 1 | Level 2 | parts supply |
|---|---|---|---|
| Error a1 | Yes | Yes | N/A |
| Error a2 | Yes | Yes | N/A |
| Error a3 | Yes | Yes | N/A |
| Error a4 | Yes | Yes | N/A |
| Error a5 | Yes | Yes | N/A |
| Error a6 | Yes | Yes | N/A |
| Error a7 | Yes | Yes | N/A |
| Error a8 | Yes | Yes | N/A |
| Error a9 | Yes | Yes | N/A |
| Error a10 | Yes | Yes | N/A |
| Error a11 | Yes | Yes | N/A |
| Error a12 | Yes | Yes | N/A |
| Error a13 | Yes | Yes | N/A |
| Error a14 | Yes | Yes | N/A |
| Error a15 | Yes | Yes | N/A |
| Error a16 | Yes | Yes | N/A |
| Error a17 | Yes | Yes | N/A |
| Error a18 | Yes | Yes | N/A |
| Error a19 | Yes | Yes | N/A |
| Error a20 | Yes | Yes | N/A |
| Error a21 | No | Yes | Parts a1 |
| Error a22 | No | Yes | Parts a2 |
| Error a23 | No | Yes | N/A |
| Error a24 | No | Yes | Parts a3 |
| Error a25 | No | Yes | N/A |
| Error a26 | No | No | N/A |
| Error a27 | No | No | N/A |
| Error a28 | No | No | Parts a4 |
| Error a29 | No | No | Parts a5 |
| Error a30 | No | No | No |

Printer_b

| Error Content | Level 1 | Level 2 | parts supply |
|---|---|---|---|
| Error b1 | Yes | Yes | N/A |
| Error b2 | Yes | Yes | N/A |
| Error b3 | Yes | Yes | N/A |
| Error b4 | Yes | Yes | N/A |
| Error b5 | Yes | Yes | N/A |
| Error b6 | Yes | Yes | N/A |
| Error b7 | Yes | Yes | N/A |
| Error b8 | Yes | Yes | N/A |
| Error b9 | Yes | Yes | N/A |
| Error b10 | Yes | Yes | N/A |
| Error b11 | Yes | Yes | N/A |
| Error b12 | Yes | Yes | N/A |
| Error b13 | Yes | Yes | N/A |
| Error b14 | Yes | Yes | N/A |
| Error b15 | Yes | Yes | N/A |
| Error b16 | No | Yes | Parts b1 |
| Error b17 | No | Yes | Parts b2 |
| Error b18 | No | Yes | N/A |
| Error b19 | No | Yes | Parts b3 |
| Error b20 | No | Yes | N/A |
| Error b21 | No | No | N/A |
| Error b22 | No | No | N/A |
| Error b23 | No | No | Parts b4 |
| Error b24 | No | No | Parts b5 |
| Error b25 | No | No | No |

Printer_c

| Error Content | Level 1 | Level 2 | parts supply |
|---|---|---|---|
| Error c1 | Yes | Yes | N/A |
| Error c2 | Yes | Yes | N/A |
| Error c3 | Yes | Yes | N/A |
| Error c4 | Yes | Yes | N/A |
| Error c5 | Yes | Yes | N/A |
| Error c6 | Yes | Yes | N/A |
| Error c7 | Yes | Yes | N/A |
| Error c8 | Yes | Yes | N/A |
| Error c9 | Yes | Yes | N/A |
| Error c10 | Yes | Yes | N/A |
| Error c11 | Yes | Yes | N/A |
| Error c12 | Yes | Yes | N/A |
| Error c13 | Yes | Yes | N/A |
| Error c14 | No | Yes | Parts c1 |
| Error c15 | No | Yes | Parts c2 |
| Error c16 | No | Yes | N/A |
| Error c17 | No | Yes | Parts c3 |
| Error c18 | No | Yes | N/A |
| Error c19 | No | No | N/A |
| Error c20 | No | No | N/A |
| Error c21 | No | No | Parts c4 |
| Error c22 | No | No | Parts c5 |
| Error c23 | No | No | No |

Printer_d

| Error Content | Level 1 | Level 2 | parts supply |
|---|---|---|---|
| Error d1 | Yes | Yes | N/A |
| Error d2 | Yes | Yes | N/A |
| Error d3 | Yes | Yes | N/A |
| Error d4 | Yes | Yes | N/A |
| Error d5 | Yes | Yes | N/A |
| Error d6 | Yes | Yes | N/A |
| Error d7 | Yes | Yes | N/A |
| Error d8 | Yes | Yes | N/A |
| Error d9 | Yes | Yes | N/A |
| Error d10 | Yes | Yes | N/A |
| Error d11 | Yes | Yes | N/A |
| Error d12 | Yes | Yes | N/A |
| Error d13 | Yes | Yes | N/A |
| Error d14 | Yes | Yes | N/A |
| Error d15 | Yes | Yes | N/A |
| Error d16 | Yes | Yes | N/A |
| Error d17 | Yes | Yes | N/A |
| Error d18 | Yes | Yes | N/A |
| Error d19 | Yes | Yes | N/A |
| Error d20 | Yes | Yes | N/A |
| Error d21 | No | Yes | Parts d1 |
| Error d22 | No | Yes | Parts d2 |
| Error d23 | No | Yes | N/A |
| Error d24 | No | Yes | Parts d3 |
| Error d25 | No | Yes | N/A |
| Error d26 | No | No | N/A |
| Error d27 | No | No | N/A |
| Error d28 | No | No | Parts d4 |
| Error d29 | No | No | Parts d5 |
| Error d30 | No | No | Parts d6 |
| Error d31 | No | No | Parts d7 |
| Error d32 | No | No | No |
| Error d33 | No | No | Parts d8 |
| Error d34 | No | No | No |
| Error d35 | No | No | No |

FIG. 10A

Fig. 10B
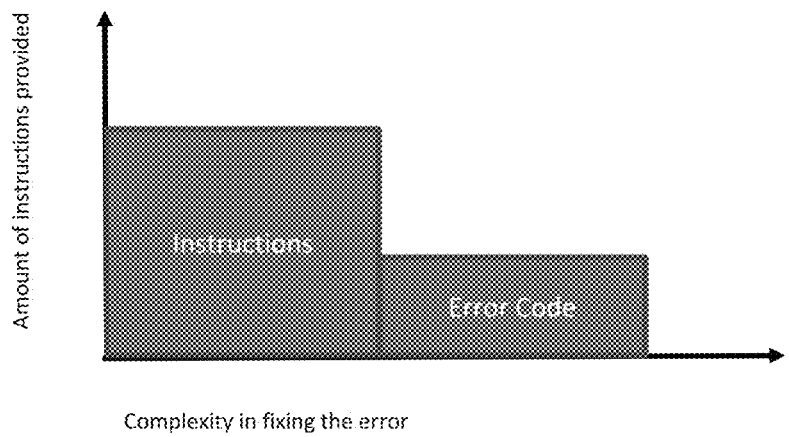
Level 1
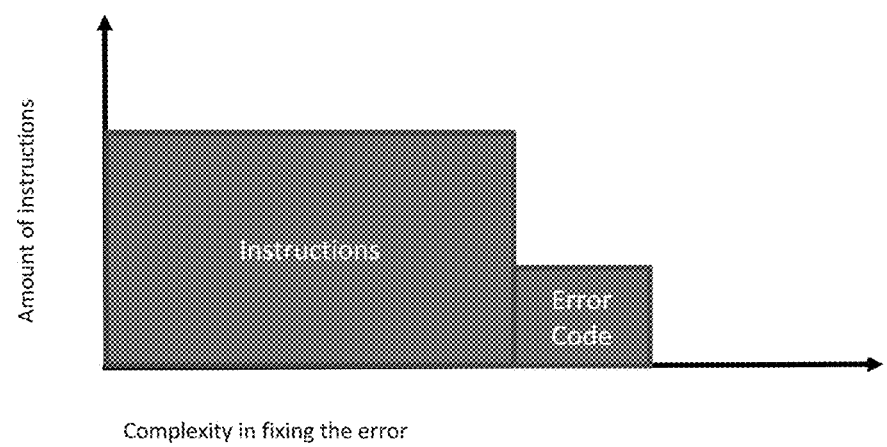
Level 2

Fig. 11

| | color | paper | double side | post processing |
|---|---|---|---|---|
| Printer_a | BW | Letter/Legal/A4/A3... | single/double | none |
| Printer_b | BW/Color | Letter/Legal/A4... | single | punch |
| Printer_c | BW/Color | Letter/Legal/A4/A3... | single/double | punch/staple |
| Printer_d | BW/Color | Letter/Legal/A4/A3... | single/double | punch/staple/perfect bind |

Fig. 12

| | | | | | | | | |
|---|---|---|---|---|---|---|---|---|
| Printer_a | Job_a1 | Job_a2 | Job_a3 | Job_a4 | Job_a5 | Job_a6 | Job_a7 | Job_a8 |
| Printer_b | Job_b1 | Job_b2 | Job_b3 | | | | | |
| Printer_c | Job_c1 | Job_c2 | | | | | | |
| Printer_d | Job_d1 | Job_d2 | Job_d3 | Job_d4 | Job_d5 | | | |

Fig. 13

Printer_a

| Parts | Supply |
|---|---|
| Parts a1 | 4 |
| Parts a2 | 0 |
| Parts a3 | 0 |
| Parts a4 | 0 |
| Parts a5 | 0 |

Printer_b

| Parts | Supply |
|---|---|
| Parts b1 | 1 |
| Parts b2 | 1 |
| Parts b3 | 2 |
| Parts b4 | 2 |
| Parts b5 | 0 |

Printer_c

| Parts | Supply |
|---|---|
| Parts c1 | 1 |
| Parts c2 | 2 |
| Parts c3 | 2 |
| Parts c4 | 2 |
| Parts c5 | 0 |

Printer_d

| Parts | Supply |
|---|---|
| Parts d1 | 0 |
| Parts d2 | 0 |
| Parts d3 | 2 |
| Parts d4 | 3 |
| Parts d5 | 1 |

Fig. 14

Printer_a

| Error Content | count | User |
|---|---|---|
| Error a21 | 1 | User_A |
| Error a22 | 0 | |
| Error a23 | 0 | |
| Error a24 | 0 | |
| Error a25 | 0 | |

Printer_b

| Error Content | count | User |
|---|---|---|
| Error b16 | 0 | |
| Error b17 | 0 | |
| Error b18 | 0 | |
| Error b19 | 0 | |
| Error b20 | 0 | |

Printer_c

| Error Content | count | User |
|---|---|---|
| Error c14 | 0 | |
| Error c15 | 0 | |
| Error c16 | 0 | |
| Error c17 | 2 | User_B, User_C |
| Error c18 | 0 | |

Printer_d

| Error Content | count | User |
|---|---|---|
| Error d21 | | |
| Error d22 | | |
| Error d23 | | |
| Error d24 | | |
| Error d25 | | |

Fig. 15

| Printer_a | Printer_b | Printer_c | Printer_d |
|---|---|---|---|
| Error a21 | Error b16 | | Error d21 |
| | | Error c15 | Error d22 |
| Error a23 | | | Error d23 |
| | Error b19 | Error c17 | |
| | Error b20 | | Error d25 |

Fig. 16

| Printer_a | | |
|---|---|---|
| Error ID | Level 1 | Level 2 |
| Error a1 | Instruction a1 | Instruction a1 |
| Error a2 | Instruction a2 | Instruction a2 |
| Error a3 | Instruction a3 | Instruction a3 |
| Error a4 | Instruction a4 | Instruction a4 |
| Error a5 | Instruction a5 | Instruction a5 |
| Error a6 | Instruction a6 | Instruction a6 |
| Error a7 | Instruction a7 | Instruction a7 |
| Error a8 | Instruction a8 | Instruction a8 |
| Error a9 | Instruction a9 | Instruction a9 |
| Error a10 | Instruction a10 | Instruction a10 |
| Error a11 | Instruction a11 | Instruction a11 |
| Error a12 | Instruction a12 | Instruction a12 |
| Error a13 | Instruction a13 | Instruction a13 |
| Error a14 | Instruction a14 | Instruction a14 |
| Error a15 | Instruction a15 | Instruction a15 |
| Error a16 | Instruction a16 | Instruction a16 |
| Error a17 | Instruction a17 | Instruction a17 |
| Error a18 | Instruction a18 | Instruction a18 |
| Error a19 | Instruction a19 | Instruction a19 |
| Error a20 | Instruction a20 | Instruction a20 |
| Error a21 | Code a21 | Instruction a21 |
| Error a22 | Code a22 | Instruction a22 |
| Error a23 | Code a23 | Instruction a23 |
| Error a24 | Code a24 | Instruction a24 |
| Error a25 | Code a25 | Instruction a25 |
| Error a26 | Code a26 | Code a26 |
| Error a27 | Code a27 | Code a27 |
| Error a28 | Code a28 | Code a28 |
| Error a29 | Code a29 | Code a29 |
| Error a30 | Code a30 | Code a30 |

| Printer_b | | |
|---|---|---|
| Error ID | Level 1 | Level 2 |
| Error b1 | Instruction b1 | Instruction b1 |
| Error b2 | Instruction b2 | Instruction b2 |
| Error b3 | Instruction b3 | Instruction b3 |
| Error b4 | Instruction b4 | Instruction b4 |
| Error b5 | Instruction b5 | Instruction b5 |
| Error b6 | Instruction b6 | Instruction b6 |
| Error b7 | Instruction b7 | Instruction b7 |
| Error b8 | Instruction b8 | Instruction b8 |
| Error b9 | Instruction b9 | Instruction b9 |
| Error b10 | Instruction b10 | Instruction b10 |
| Error b11 | Instruction b11 | Instruction b11 |
| Error b12 | Instruction b12 | Instruction b12 |
| Error b13 | Instruction b13 | Instruction b13 |
| Error b14 | Instruction b14 | Instruction b14 |
| Error b15 | Instruction b15 | Instruction b15 |
| Error b16 | Code b16 | Instruction b16 |
| Error b17 | Code b17 | Instruction b17 |
| Error b18 | Code b18 | Instruction b18 |
| Error b19 | Code b19 | Instruction b19 |
| Error b20 | Code b20 | Instruction b20 |
| Error b21 | Code b21 | Code b21 |
| Error b22 | Code b22 | Code b22 |
| Error b23 | Code b23 | Code b23 |
| Error b24 | Code b24 | Code b24 |
| Error b25 | Code b25 | Code b25 |

| Printer_c | | |
|---|---|---|
| Error ID | Level 1 | Level 2 |
| Error c1 | Instruction c1 | Instruction c1 |
| Error c2 | Instruction c2 | Instruction c2 |
| Error c3 | Instruction c3 | Instruction c3 |
| Error c4 | Instruction c4 | Instruction c4 |
| Error c5 | Instruction c5 | Instruction c5 |
| Error c6 | Instruction c6 | Instruction c6 |
| Error c7 | Instruction c7 | Instruction c7 |
| Error c8 | Instruction c8 | Instruction c8 |
| Error c9 | Instruction c9 | Instruction c9 |
| Error c10 | Instruction c10 | Instruction c10 |
| Error c11 | Instruction c11 | Instruction c11 |
| Error c12 | Instruction c12 | Instruction c12 |
| Error c13 | Instruction c13 | Instruction c13 |
| Error c14 | Code c14 | Instruction c14 |
| Error c15 | Code c15 | Instruction c15 |
| Error c16 | Code c16 | Instruction c16 |
| Error c17 | Code c17 | Instruction c17 |
| Error c18 | Code c18 | Instruction c18 |
| Error c19 | Code c19 | Code c19 |
| Error c20 | Code c20 | Code c20 |
| Error c21 | Code c21 | Code c21 |
| Error c22 | Code c22 | Code c22 |
| Error c23 | Code c23 | Code c23 |

| Printer_d | | |
|---|---|---|
| Error ID | Level 1 | Level 2 |
| Error d1 | Instruction d1 | Instruction d1 |
| Error d2 | Instruction d2 | Instruction d2 |
| Error d3 | Instruction d3 | Instruction d3 |
| Error d4 | Instruction d4 | Instruction d4 |
| Error d5 | Instruction d5 | Instruction d5 |
| Error d6 | Instruction d6 | Instruction d6 |
| Error d7 | Instruction d7 | Instruction d7 |
| Error d8 | Instruction d8 | Instruction d8 |
| Error d9 | Instruction d9 | Instruction d9 |
| Error d10 | Instruction d10 | Instruction d10 |
| Error d11 | Instruction d11 | Instruction d11 |
| Error d12 | Instruction d12 | Instruction d12 |
| Error d13 | Instruction d13 | Instruction d13 |
| Error d14 | Instruction d14 | Instruction d14 |
| Error d15 | Instruction d15 | Instruction d15 |
| Error d16 | Instruction d16 | Instruction d16 |
| Error d17 | Instruction d17 | Instruction d17 |
| Error d18 | Instruction d18 | Instruction d18 |
| Error d19 | Instruction d19 | Instruction d19 |
| Error d20 | Instruction d20 | Instruction d20 |
| Error d21 | Instruction d21 | Instruction d21 |
| Error d22 | Instruction d22 | Instruction d22 |
| Error d23 | Instruction d23 | Instruction d23 |
| Error d24 | Instruction d24 | Instruction d24 |
| Error d25 | Instruction d25 | Instruction d25 |
| Error d26 | Code d26 | Code d26 |
| Error d27 | Code d27 | Code d27 |
| Error d28 | Code d28 | Code d28 |
| Error d29 | Code d29 | Code d29 |
| Error d30 | Code d30 | Code d30 |
| Error d31 | Code d31 | Code d31 |
| Error d32 | Code d32 | Code d32 |
| Error d33 | Code d33 | Code d33 |
| Error d34 | Code d34 | Code d34 |
| Error d35 | Code d35 | Code d35 |

SYSTEM AND METHOD OF DETERMINING IF USERS CAN FIX OR REPAIR MFP ERRORS IN A PRINTING SYSTEM

FIELD OF THE INVENTION

The present disclosure relates to a system and method of determining if multi-function peripheral (MFP) errors can be replaced or repaired by a user, and more particularly, if the MFP can be serviced or repaired by a user, for example, by an employee in a print shop without having to call a service technician to come out to the print shop to service or repair the MFP.

BACKGROUND OF THE INVENTION

In a print shop, there can be many situations where the user will encounter an error that cannot be fixed because it requires expertise or special training to repair or correct the error. For example, paper jams is an error that is fixable by the user. However, replacing an MFP's photoreceptor belt is not a repair that can typically be done by the user. In these situations, typically, the user has no other alternative but to call the local service company to send a technician to repair the MFP.

Depending on the availability of the technician, it may be a few hours, or, a few days before they are free to visit the print shop to repair the MFP. If, for example, it takes a few days before the technician shows up, this will potentially be a problem for the print shop because it means that there is long period of machine downtime for the MFP. In addition, having this downtime can cause a loss of revenue for the print shop since the print shop may not be able to provide printing services for their customer.

SUMMARY OF THE INVENTION

In consideration of the above issues, it would be desirable to have a method and system are disclosed to determine if an error can be repaired by a user, or alternatively, if a service technician needs to be called.

A method is disclosed for a server connectable to at least one printer to judge an error level, the method comprising: (a) receiving a notification of a given error which has occurred at a given printer; (b) judging on whether there is an unfinished job corresponding to the given printer; (c) judging on whether the unfinished job can be redirected to other printer than the given printer; and (d) determining an error level for displaying the given error based on the judgment at step (c).

A server is disclosed which is configured to be connected to at least one printer, the server comprising: a processor configured to: (a) receive a notification of a given error which has occurred at a given printer; (b) judge on whether there is an unfinished job corresponding to the given printer; (c) judge on whether the unfinished job can be redirected to other printer than the given printer; and (d) determine an error level for displaying the given error based on the judgment at step (c).

A system is disclosed for judging an error level on a printer, the system comprising: a server which is configured to be connected to at least one printer, the server having a processor configured to: (a) receive a notification of a given error which has occurred at a given printer; (b) judge on whether there is an unfinished job corresponding to the given printer; (c) judge on whether the unfinished job can be redirected to other printer than the given printer; and (d) determine an error level for displaying the given error based on the judgment at step (c); and at least one printer, each of the at least one printer configured to: generate the notification of the given error; send an error identifier (ID) to the server; receive an instruction from the server for the displaying of the given error; and display the error information based on the instruction received from the server.

A non-transitory computer readable recording medium stored with a computer readable program code for a server connectable to at least one printer to judge an error level is disclosed, the computer readable program code configured to execute a process comprising: (a) receiving a notification of a given error which has occurred at a given printer; (b) judging on whether there is an unfinished job corresponding to the given printer; (c) judging on whether the unfinished job can be redirected to other printer than the given printer; and (d) determining an error level for displaying the given error based on the judgment at step (c).

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7A is an illustration of a printer display showing an error message in accordance with an exemplary embodiment.

FIG. 7B is an illustration of a printer display showing an error message in accordance with an exemplary embodiment.

FIG. 10A is an error table in accordance with an exemplary embodiment.

FIG. 10B is a comparison of level 1 errors versus a level 2 errors in accordance with an exemplary embodiment.

FIG. 11 is an illustration of a printer capabilities table in accordance with an exemplary embodiment.

FIG. 12 is an illustration of a print queue table in accordance with an exemplary embodiment.

FIG. 13 is an illustration of a parts supply table in accordance with an exemplary embodiment.

FIG. 14 is an illustration of a history table in accordance with an exemplary embodiment.

FIG. 15 is an illustration of an error matching table in accordance with an exemplary embodiment.

FIG. 16 is an illustration of a reference table in accordance with an exemplary embodiment.

DETAILED DESCRIPTION

Figure 1:
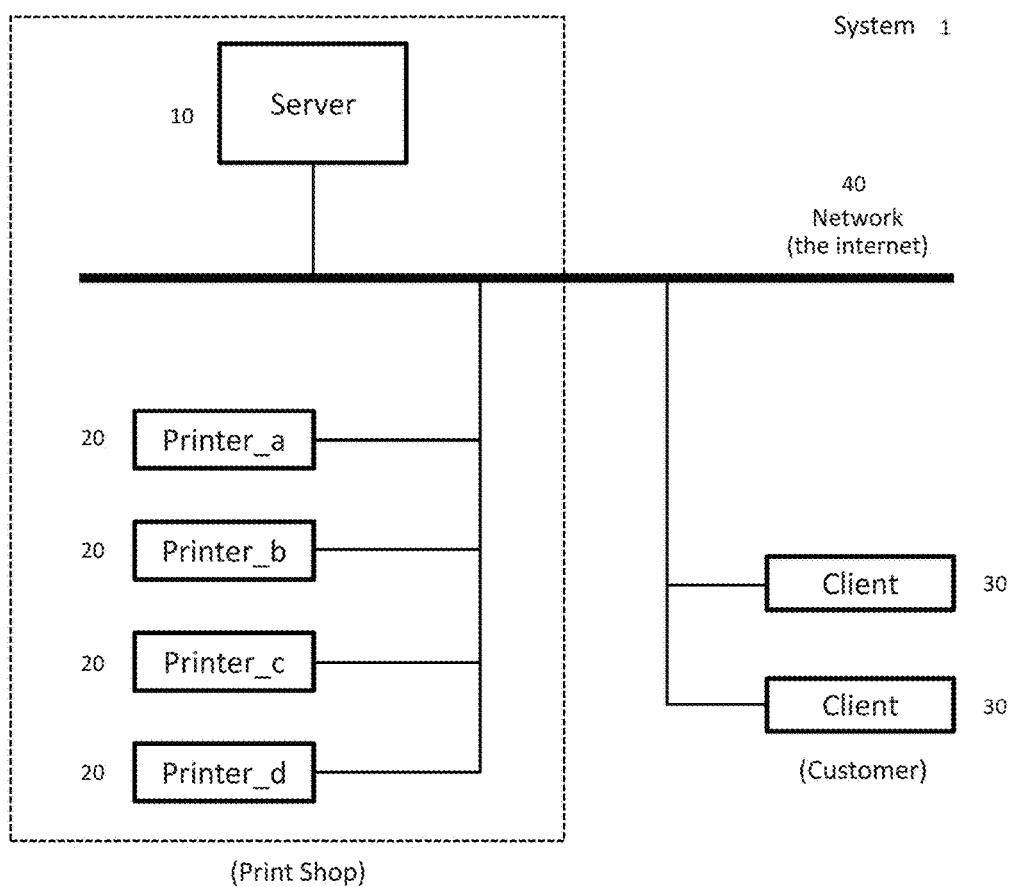
FIG. 1 is a diagram of an exemplary system in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, it would be desirable to have a method and system, which can, for example, help print shops reduce MFP machine down time, help print shops reduce maintenance costs, help local service companies reduce service expenses, allow print shops to minimize possible loss of business revenue, and provide users an opportunity to gain knowledge of MFP repairs.

In accordance with an exemplary embodiment, for example, a "print shop" can be a company that purchases an MFP from a manufacturer and uses the MFP to provide billable printing services for its own customers. A typical company, for example, would be Kinko's®. A "user" can be, for example, an employee of the print shop.

In accordance with an exemplary embodiment, a "customer" can be a person or company who pays for the printing services provided by the print shop. For example, a typical company could be marketing departments of companies who go to print shops the print out many kinds of marketing brochures. "MFP manufacturer" can be a company that manufactures MFP machines, for example, Konica Minolta, Inc. In accordance with an exemplary embodiment, a "local service company" can be a local office of an MFP manufacturer. A "technician" can be an employee of the local service company who repairs and services the MFP.

In accordance with an exemplary embodiment, for example, a "Level 1 Error" can be a type of error, for which there is a lower range of complexity that is fixable by the user, and a "Level 2 Error" is a type of error, for which there is a higher range of complexity that may be fixable by the user.

FIG. 1 is a diagram of a system 1, which can help determine if a Multi-Function Peripheral (MFP) error can be repaired by users, for example, in a print shop. As shown in FIG. 1, the system 1 can include at least one server 10, at least one printer 20, and one or more client devices 30. In accordance with an exemplary embodiment, a job, for example, a print job can be received by the at least one printer 20 from one or more client devices 30. The server 10, the at least one printer 20, and the one or more client devices 30 can be in communication via a communication network (or network) 40. In accordance with an exemplary embodiment, the at least one printer 20 can include a plurality of printers 20, for example, Printer_a, Printer_b, Printer_c, and Printer_d. In such a case, the plurality of printers 20 can be registered in the server 10 in advance.

Figure 2:
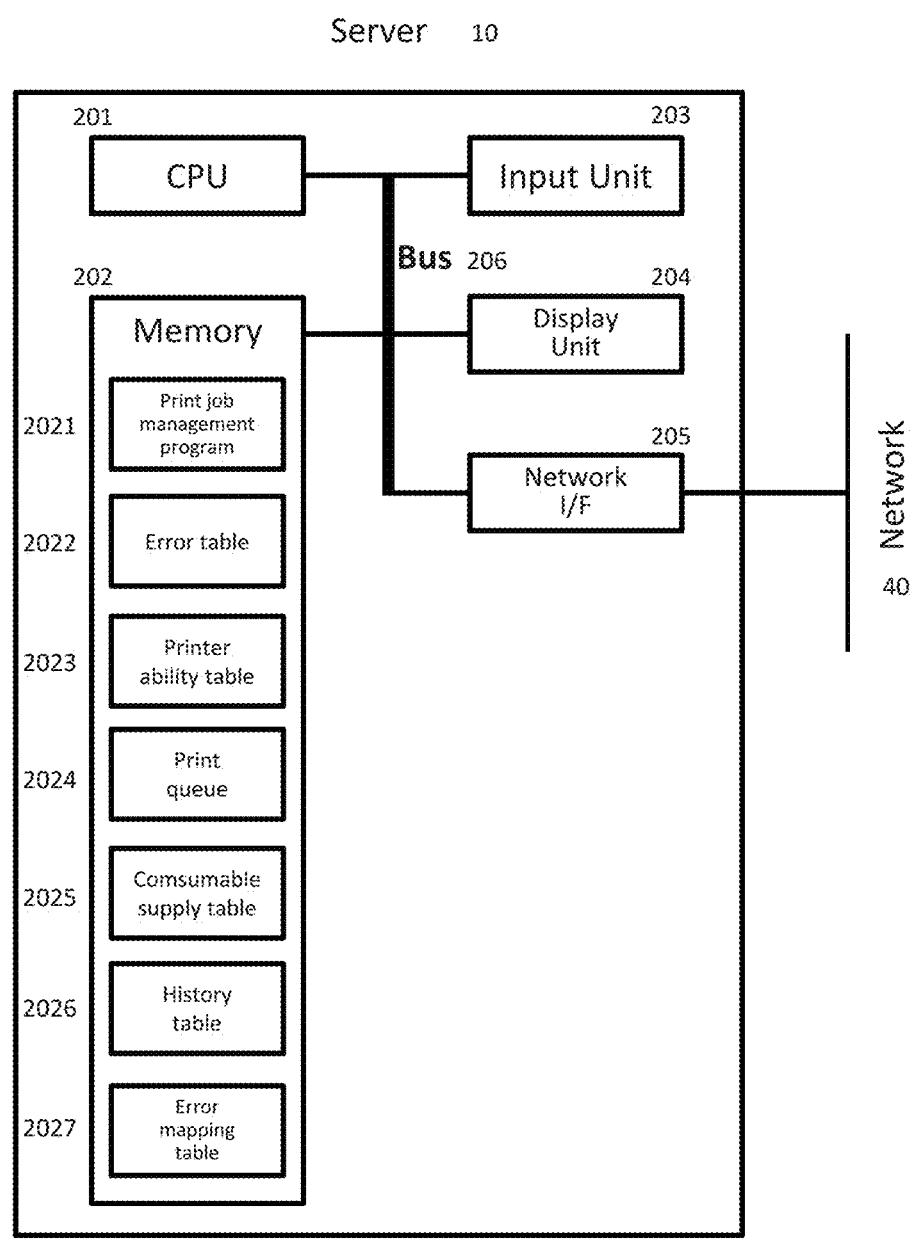
FIG. 2 is a diagram of an exemplary printer server (or server) for use with the system as shown in FIG. 1.

FIG. 2 is a diagram of an exemplary server 10 for use with the system 1 as shown in FIG. 1. As shown in FIG. 2, the server 10 can include a processor or central processing unit (CPU) 201, and one or more memories 202 for storing software programs and data (such as files to be printed). For example, the software programs can include a print job management program 2021, an error table 2022, a printer capability table 2023, a print queue 2024, a consumable supply (or parts) table 2025, a history table 2026, and an error mapping table 2027. The processor or CPU carries out the instructions of a computer program, which operates and/or controls at least a portion of the functionality of the server 10. The server 10 can also include an input unit 203, a display unit or graphical user interface (GUI) 204, and a network interface (I/F) 205, which is connected to the communication network (or network) 40. A bus 206 can connect the various components 201, 202, 203, and 204 within the server 10. The server 10 can also include an operating system (OS), which manages the computer hardware and provides common services for efficient execution of various software programs.

In accordance with an exemplary embodiment, the network 40 can be a public telecommunication line and/or a network (for example, LAN or WAN) 40. Examples of the communication network 40 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

Figure 3:
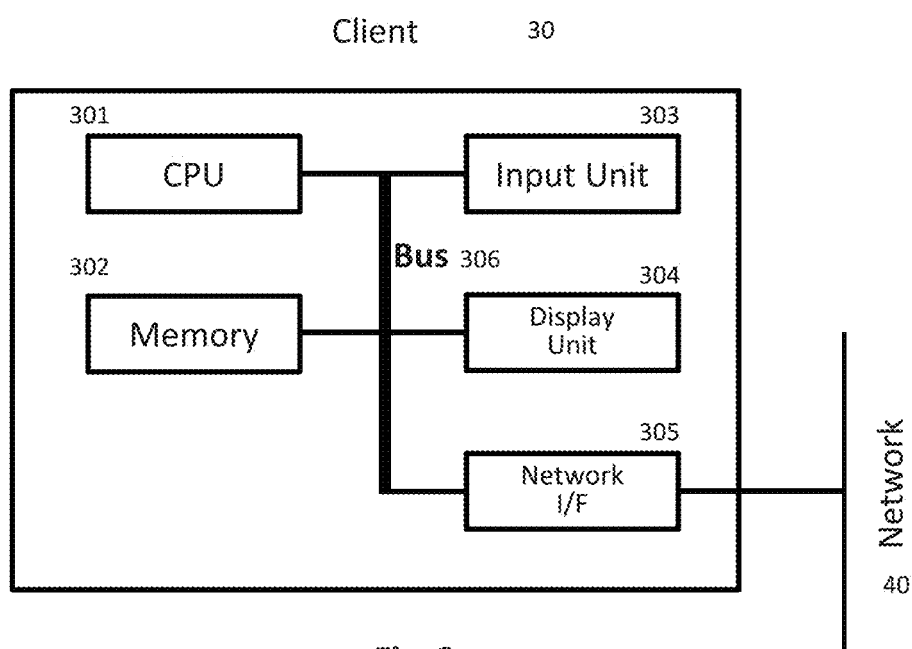
FIG. 3 is a diagram of an exemplary client device for use with the system as shown in FIG. 1.

FIG. 3 is a diagram of an exemplary client device 30 for use with the system 1 as shown in FIG. 1. As shown in FIG. 3, the client device 30 can include a processor or central processing unit (CPU) 301, and one or more memories 302 for storing software programs and data (such as files to be printed). The processor or CPU carries out the instructions of a computer program, which operates and/or controls at least a portion of the functionality of 2the client device 30. The client device 30 can also include an input unit 303, a display unit or graphical user interface (GUI) 304, and a network interface (I/F) 305, which is connected to the communication network (or network) 40. A bus 306 can connect the various components 301, 302, 303, 304, 305 within the client device 30.

The client device 30 includes an operating system (OS), which manages the computer hardware and provides common services for efficient execution of various software programs. The software programs can include, for example, application software and printer driver software. For example, the printer driver software controls a multifunction printer or printer, for example connected with the client device 30 in which the printer driver software is installed via the communication network 40. In certain embodiments, the printer driver software can produce a print job and/or document based on an image and/or document data. In addition, the printer driver software can control transmission of the print job from the client device 30 to the plurality of printers 20.

Figure 4:
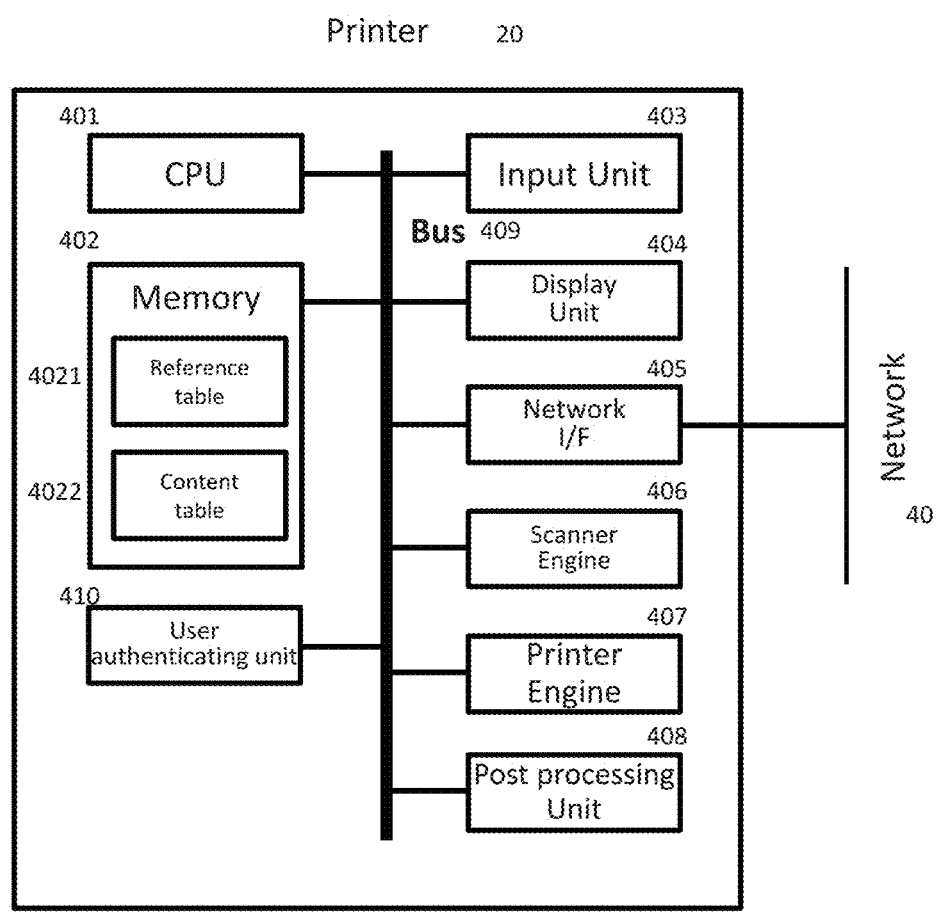
FIG. 4 is a diagram of an exemplary printer or multi-functional peripheral (MFP) for use with the system as shown in FIG. 1.

FIG. 4 is a diagram of an exemplary printer or multifunction peripheral (MFP) 20 for use with the system 1 as shown in FIG. 1. As shown in FIG. 4, the printer 20 can include a processor or central processing unit (CPU) 401, and one or more memories 402 for storing software programs and data (such as files to be printed). For example, the software programs can include a reference table 4021 and a content table 4022. The processor or CPU carries out the instructions of a computer program, which operates and/or controls at least a portion of the functionality of the printer 20. The printer 20 can also include an input unit 403, a display unit or graphical user interface (GUI) 404, a network interface (I/F) 405, which is connected to a communication network (or network) 40, a scanner engine 406, a printer engine 407, a post processing unit 408, and a user authenticating unit 410. In accordance with an exemplary embodiment, the authenticating unit 410 can authenticate a user before the user uses or repairs the printer (or MFP) 20, therefore, the printer 20 can recognize a user who uses or repairs the printer 2. When a given error is fixed, the authenticating user is registered in a history table as a repairing user corresponding to the given error. A bus 409 can connect the various components 401, 402, 403, 404, 405, 406, 407, 408, and 410 within the printer 20. The printer 20 also includes an operating system (OS), which manages the computer hardware and provides common services for efficient execution of various software programs.

In accordance with an exemplary embodiment, it can be within the scope of the disclosure for the printer 20 to be a copier. The printer or print engine 407 has access to a print media (not shown) of various sizes and workflow for a print job, which can be, for example, stored in the input tray. A "print job" or "document" can be a set of related sheets, usually one or more collated copy sets copied from a set of original print job sheets or electronic document page images, from a particular user, or otherwise related.

For example, in accordance with an exemplary embodiment, an image processing section within the printer 20 can carry out various image processing under the control of a print controller or CPU 401, and sends the processed print image data to the printer engine 407. The image processing section can also include a scanner section for optically reading a document, such as an image recognition system. The scanner section receives the image from the scanner and converts the image into a digital image. The printer engine 407 forms an image on a recording sheet based on the image data sent from the image processing section. The central processing unit (CPU) (or processor) 401 and the memory 402 can include a program for RIP processing (Raster Image Processing), which is a process for converting print data included in a print job into Raster Image data to be used in the printer or printer engine 407. The CPU 401 can include a printer controller configured to process the data and job information received from the one or more client devices (not shown), for example, received via the network connection unit and/or input/output section (I/O section) 405.

The CPU 401 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more client devices (not shown) to generate a print image.

The network I/F 405 performs data transfer with the server 10 or the one or more client devices 30. The printer controller can be programmed to process data and control various other components of the multi-function peripheral to carry out the various methods described herein. In accordance with an exemplary embodiment, the operation of printer section commences when it receives a page description from the one or more client devices (not shown) via the network I/F 405 in the form of a print job data stream and/or fax data stream. The page description may be any kind of page description languages (PDLs), such as PostScript® (PS), Printer Control Language (PCL), Portable Document Format (PDF), and/or XML Paper Specification (XPS).

Examples of printers 20 consistent with exemplary embodiments of the disclosure include, but are not limited to, a multi-function peripheral (MFP), a laser beam printer (LBP), an LED printer, a multi-function laser beam printer including copy function.

In accordance with an exemplary embodiment as disclosed herein, it can be desirable, that once an error is detected on the printer or MFP 20, which is classified as a "Level 2 Error", which is a type of error, for which there is a higher range of complexity that may be fixable by the user, and that the user should call for service, if possible. However, for example, in extreme cases, the user may have to repair the printer, for example, if the error or problem causes significant downtime to the user. However, in accordance with an exemplary embodiment, allowing the user to fix or remedy the error or problem can have its limitations. Thus, it would be desirable to have a method and system, which helps judge or determine at which point, the users is provided with instructions to repair the printer by themselves, or alternatively, if the error is such that the service technician should be called.

Figure 5:
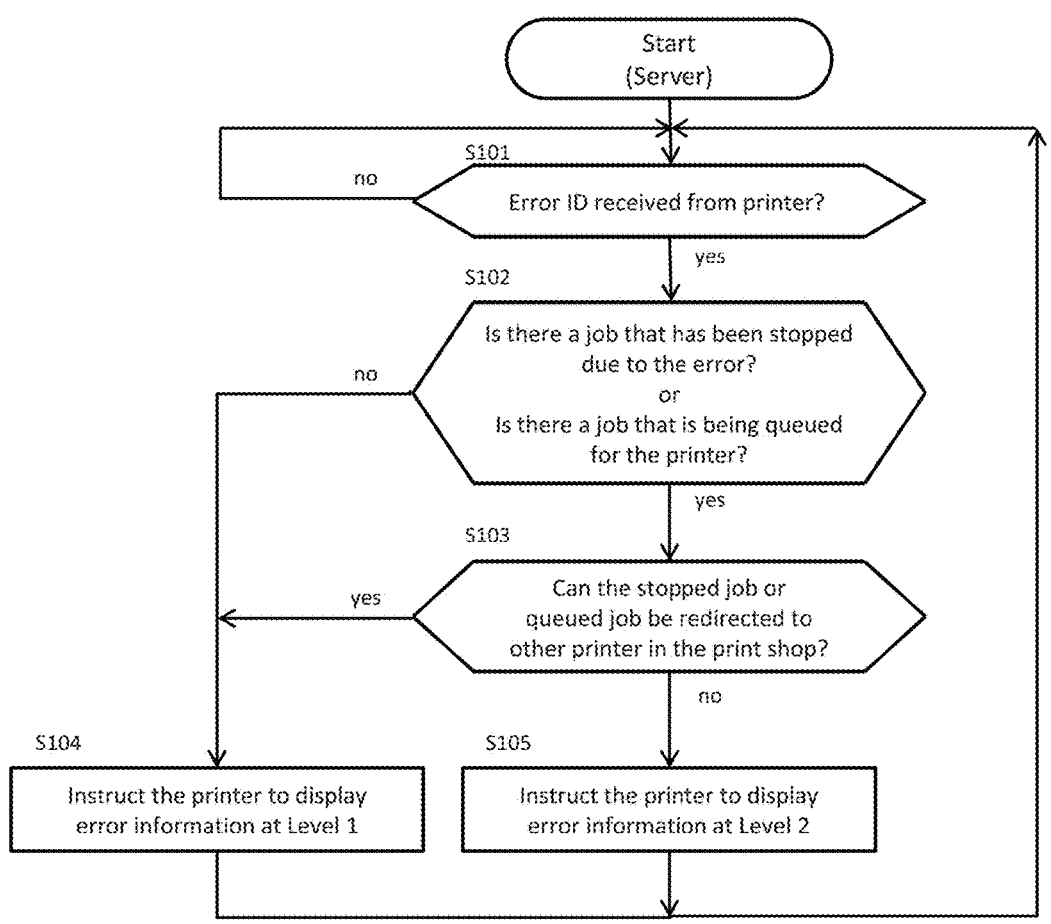
FIG. 5 is flow chart illustrating a process for a server in accordance with an exemplary embodiment.
Figure 6:
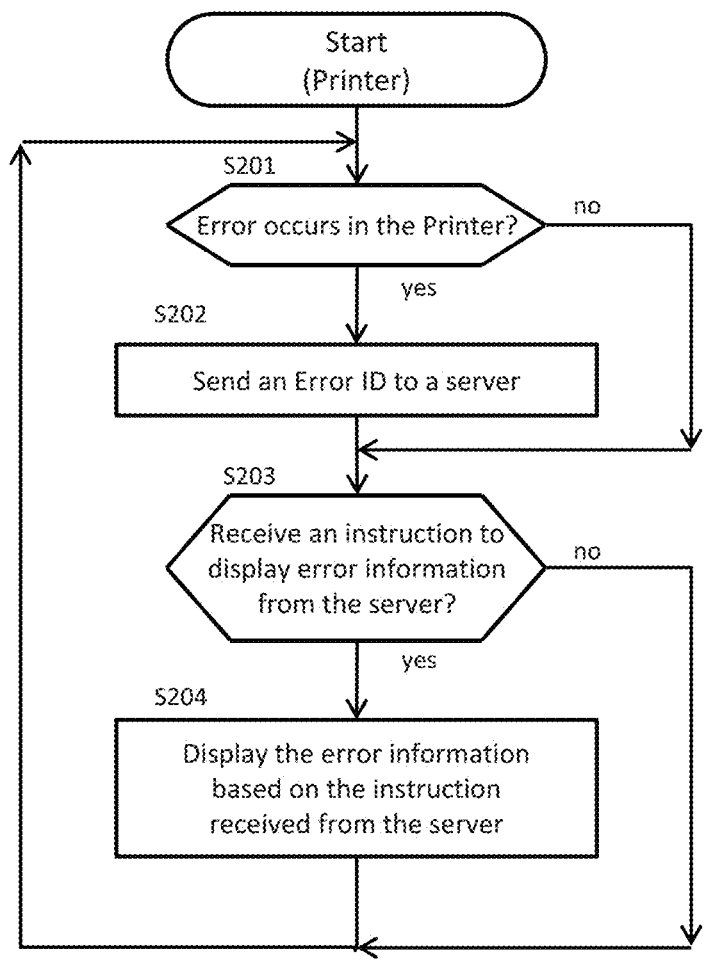
FIG. 6 is a flow chart illustrating a process for a printer or multi-functional peripheral (MFP) in accordance with an exemplary embodiment.

FIGS. 5 and 6 are flow charts illustrating a process for a server and a printer, respectively, in accordance with an exemplary embodiment. As shown in FIG. 5, the printer thread checks if there is a machine (printer) error that has occurred in the printer at S201 (FIG. 6). If YES, the printer 20 notifies the server 10 that an error has occurred in step S101. As shown in FIG. 5, on the server side, once the error has been received by the server at S101, a determination can be made in step S201, if there is a job that been stopped due to the error or if there is a job that is being queued for the printer. In accordance with an exemplary embodiment, the server determines whether there is a queued job by referring to the print queue table 2024.

If there is an unfinished job (i.e., Yes), then a determination is made in step S103, if the unfinished job can be redirected to another printer in the system. If the print job can re-direct, in step S104, the server can instruct the printer 20 to lower the user's capability to a Level 1 since it is not critical that the user has machine downtime because it can re-direct the job to another printer.

In accordance with an exemplary embodiment, it would be preferable that the user calls for service to fix or repair the error ID received from the printer 20. In accordance with an exemplary embodiment, to determine whether the system can re-direct the job, the process refers to the printing capabilities table 2023 to check, if the printer 20 has all the printer attributes to print the job.

In step S102, if there is/are no job(s) in the queue, for example, a job has been deleted from the queue since the job has been successfully printed or completed, the process can specify user's capability to a Level 1 in step S104, since this situation can be classified a "non-critical downtime situation", and thus as much as possible, the user should call for service. Alternatively, if there is/are no job(s) in the queue, for example, when a job has been deleted from the queue after the job is sent to a printer, and if the printing of the job has been stopped due to an error, in this situation, the process continues to step S103.

In accordance with an exemplary embodiment, in step S103, if there are one or more print jobs in the print queue, or alternatively, if a job, which has been deleted from the queue and the printing of the job was stopped before the job was completed, and where the jobs cannot be redirect to another printer in the system 10, the situation can be classified as "critical downtime mode", and the user's capability is specified as a Level 2 at S105.

FIG. 6 is an illustration of a printer or image forming apparatus in accordance with an exemplary embodiment. As shown in FIG. 6, in step S201, a determination is made if an error has occurred in the printer 20. If an error has occurred, i.e., YES, the process continues to step S202, where an error ID is sent to the server 10, and the process proceeds as illustrated in FIG. 5, step S101.

In step S203, if the printer 20 has received a message or an instruction (step S104 or S105 as illustrated in FIG. 5) from the server 10 to display an error message, in step S204, the graphical user interface or display unit 404 on the printer 20 will display the error information based on the instruction received from the server 10.

FIG. 7A is an illustration of a printer display 404 showing an error message in accordance with an exemplary embodiment. As shown in FIG. 7A, the message can include an error code, for example, a21 (Level 1) or a26 (Level 2), and, for example, if the print job can be redirected to another printer, the printer display 404 can state "Please call to a service person."

FIG. 7B is an illustration of a printer display 404 showing an error message in accordance with an exemplary embodiment. As shown in FIG. 7B, the message can include an error code, for example, a21 (Level 2) or a20 (Level 1), and if a Level 1 or 2 message is received in which, for example, the queued job cannot be redirected to another printer, the printer display 404 can provide instructions for fixing the error as illustrated.

Figure 8:
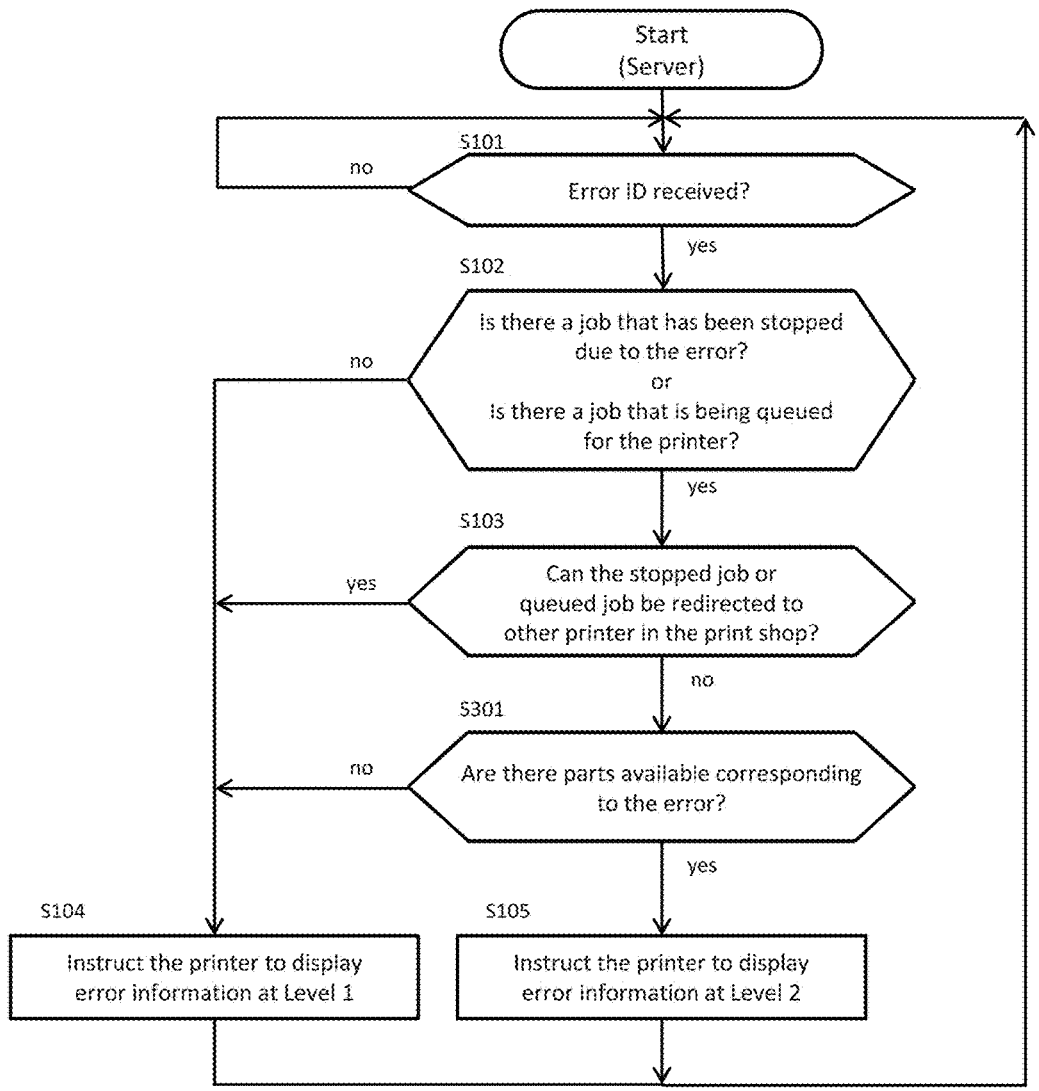
FIG. 8 is a flow chart illustrating a process of a server in accordance with an exemplary embodiment.

FIG. 8 is a flow chart illustrating a process of a server in accordance with an exemplary embodiment. As shown in FIG. 8, the process is similar to the process as shown in FIG. 5. However, in FIG. 8, in step S103, if the stopped job or queued job cannot be redirected to another printer in the print shop, in step S301, a determination is made if there are parts available corresponding to the error. Specifically, a determination is made if parts are available for the user to service the printer. If parts are available, the process proceeds to step S105, where the printer 20 is instructed to display error information at a Level 2. If parts are not available, the process continues to step S104, where the printer 20 is instructed to display error information at a Level 1.

Figure 9:
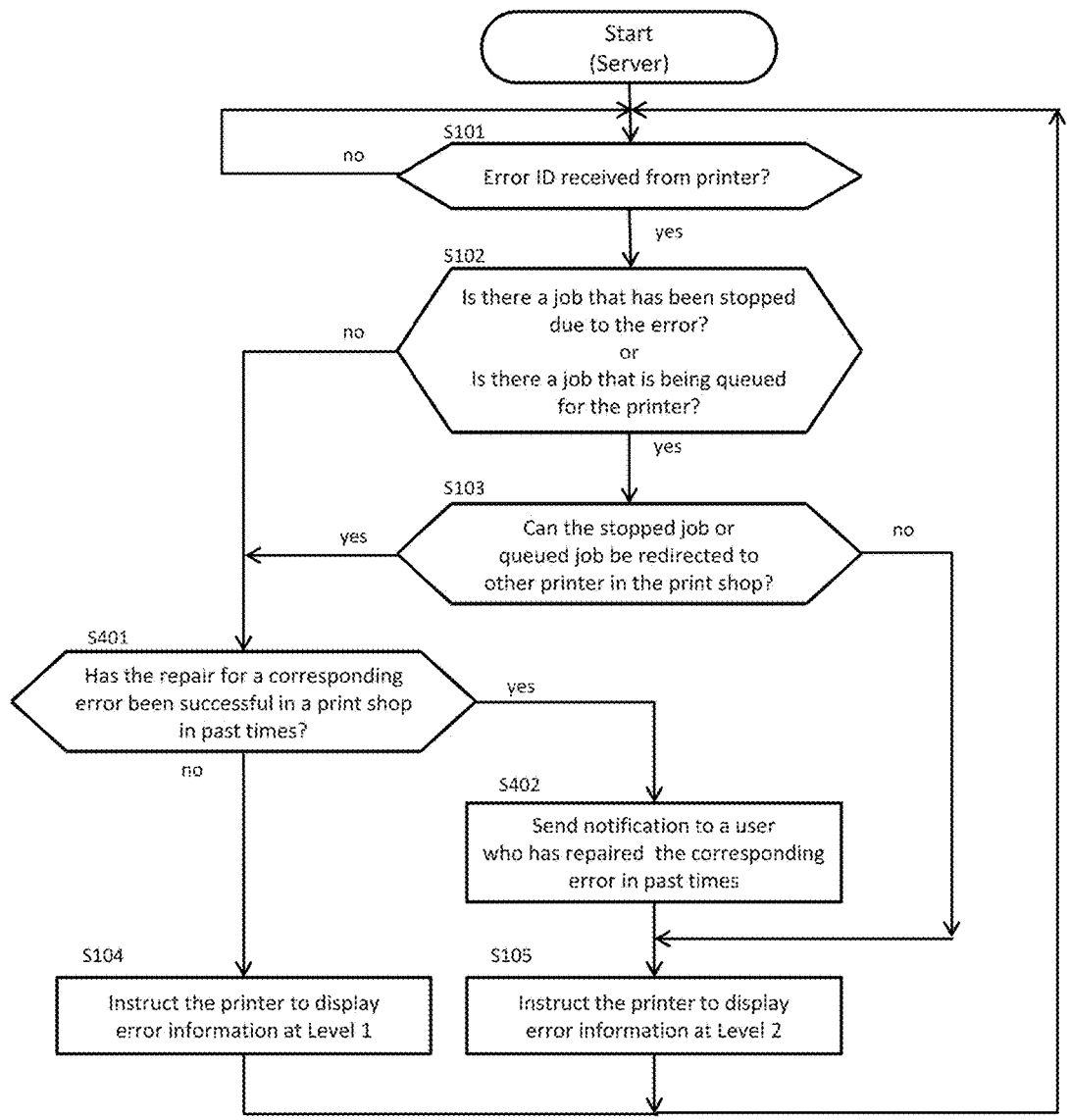
FIG. 9 is a flow chart illustrating a process of a server in accordance with an exemplary embodiment.

FIG. 9 is a flow chart illustrating a process of a server in accordance with an exemplary embodiment. As shown in FIG. 9, the process is similar to the process as shown in FIG. 5. However, in FIG. 9, in step S103, if the stopped job or queued job cannot be redirected to another printer in the print shop, the process continues to step S105, where the printer is instructed to display error information at a Level 2. In addition, if the stopped job or queued job can be redirected to another printer in the print shop, in step S401, a determination is made if the repair for a corresponding error has been successful in the print shop in the past. If the repair has not been successfully in the print shop in the past, the process continues to step S104, where the printer is instructed to display error information at Level 1. If the repair for a corresponding error has been successfully repaired in the print shop in the past, the process continues to step S402, where a notification can be sent to a user who has repaired the corresponding error in the past, and proceeds to step S105, where the printer is instructed to display error information at a Level 2.

FIG. 10A is an error table 2022 (FIG. 2) in accordance with an exemplary embodiment. As shown in FIG. 10A, the error table 2022 on the server 10 can include each of the one or more printers 20, for example, Printer_a, Printer_b, Printer-c, and Printer_d. For each of the printers, the possible errors or error content are listed, the type of error, Level 1 or Level 2, and if parts are needed to fix the error. In addition, if parts are needed, the error table 2022 can include one or more types of parts, for example, parts a1, parts a2, parts a3, parts a4, parts a5.

As shown in FIG. 10A, a "Yes" means that instructions are displayed on how to resolve the error. A "No" means that only an error code is displayed (without any instructions). If only an error code is displayed, the user has to call a technician to resolve the issue. From this table, also note that Level 1 errors do not require parts whereas Level 2 errors may or may not require parts to resolve the issue.

FIG. 10B is a comparison of a Level 1 error versus a Level 2 error in accordance with an exemplary embodiment. As shown in FIG. 10B, the Level 1 and Level 2 errors can include an amount of instructions for each type of error and can be based on the complexity in fixing the error. Accordingly, those errors that can be fixed with a defined number of instructions and are relatively easier, for example, the complexity is not great, and the user can be provided with instructions to repair the problem. Alternatively, for the more complex errors, the user will be provided instructions to call a service technician or repair person.

In accordance with an exemplary embodiment, other factors involved in determining whether the error should be classified as a Level 1 or Level 2 error can include such factors as whether parts are needed, and if those parts are available in inventory. For example, to determine whether the error requires parts and whether there is inventory of those parts, the system 1 can check the error table 2022 and parts supply table 2025. Another factor can be the repair history of the user fixing the machine. In accordance with an exemplary embodiment, to determine if the user has a repair history of the particular error, the system 1 can check the history table 2026.

FIG. 11 is an illustration of a printer capabilities table 2023 (FIG. 2) in accordance with an exemplary embodiment. As shown in FIG. 11, the printer capabilities table 2023 can include each of the one or more printers 20, and one or more types of processes, for example, color capabilities (for example, color, black and white (BW), or color and black and white), paper (Letter, Legal, A4, A3 . . .), double side (single/double sided), and post processing (none, punch, punch/staple, punch/staple/perfect bind). In accordance with an exemplary embodiment, the printer capabilities table 2023 not only describes the capabilities of the printer, but also can be used to determine or judge, which printer can accept a re-routed job or re-directed job.

FIG. 12 is an illustration of a print queue table 2024 (FIG. 2) in accordance with an exemplary embodiment. As shown in FIG. 12, the print queue table 2024 can include each of the one or more printers 20, and a listing of each of the one or more jobs, if a job is present in the print queue table 2024 for the printer 20. For example, for each printer 20, a listing of print jobs, for example, Printer_a can include Job_a1, Job_a2, Job_a3, Job_a4, Job_a5, Job_a6, Job_a7, and Job_a8. The printing queue table preferably consists of all the jobs that are currently queued up for each printer 20.

FIG. 13 is an illustration of a parts supply table (or consumable supply table) 2025 (FIG. 2) in accordance with an exemplary embodiment. As shown in FIG. 13, for each of the one or more printers 20, each of the consumable parts can be identified and a number (or supply) of the consumable parts present at the print shop can be identified. As shown in FIG. 13, the parts supply table 2025 contains information about the print shop's parts inventory, and is linked to the error table 2022.

FIG. 14 is an illustration of a history table 2026 (FIG. 2) in accordance with an exemplary embodiment. As shown in FIG. 14, for each of the one or more printers 20, a history of each type of error, for example, Error a21, Error 22, and frequency or counts of the times the error has occurred, and if the error has been fixed, for example, User, User_A. As shown, the history table contains information about the service repair history performed by each user.

FIG. 15 is an illustration of an error matching table 2027 (FIG. 2) in accordance with an exemplary embodiment. As shown in FIG. 15, each of the one or more printers 20 are identified, and the error matching table 2027 shows which errors are similar and can be fixed by the same user. For example, if an error occurs at Printer_b, Error b16, the system will check the history table 2026 and determines that there are no user who have experience fixing such errors. However, for example, in the error matching table 2027, it can be see that Error b16 of Printer_b is similar to Error a21 of Printer_a. If you look at the History Table of Printer_a, the system can find that User_A has had experience fixing a similar problem. Thus, even though there is no experience fixing an error in a particular printer, but looking at error matching table 2027, the system 1 can determine that some other user may be able to help and fix a similar problem. Thus, as shown in FIG. 15, the error matching table 2027 shows which errors are similar to each other, and for example, in the case that the print shop has different printer models, different error codes may be fixed by the same user as they are all similar errors.

FIG. 16 is an illustration of a reference table 2027 (FIG. 2) in accordance with an exemplary embodiment. As shown in FIG. 16, for each of the one or more printers 20, the reference table can include an Error ID (error identifier), for example, Error a1, Error a2 . . . , and instructions or error codes for each of the Error IDs depending if the error is classified as a Level 1 or Level 2.

Figure 17:
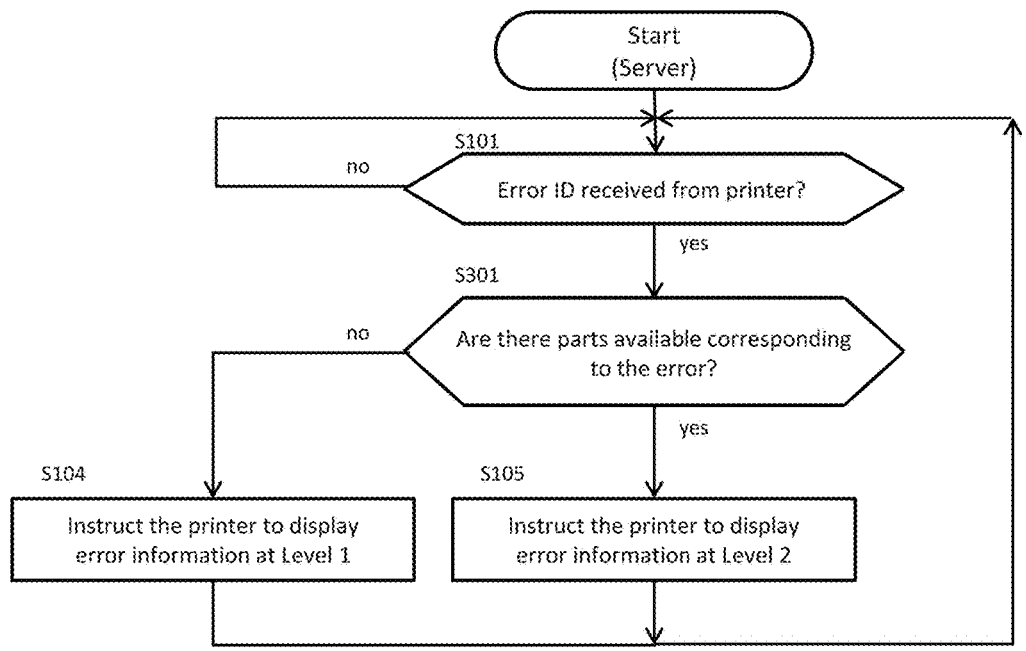
FIG. 17 is a flowchart illustrating a process for a server in accordance with an exemplary embodiment.

FIG. 17 is a flowchart illustrating a process for a server in accordance with an exemplary embodiment. As shown in FIG. 17, on the server side, in step S101, a determination is made if an error ID has been received from the printer 20. If an error ID has been received, in step S301, the process continues to step S303, where a determination is made if parts are available corresponding to the error. If parts are available, the process continues to step S105, where the server instructs the printer to display error information at Level 2. If parts are not available, in step S301, the process continues to step S104, where the server 10 instructs the printer to display error information at Level 1.

Figure 18:
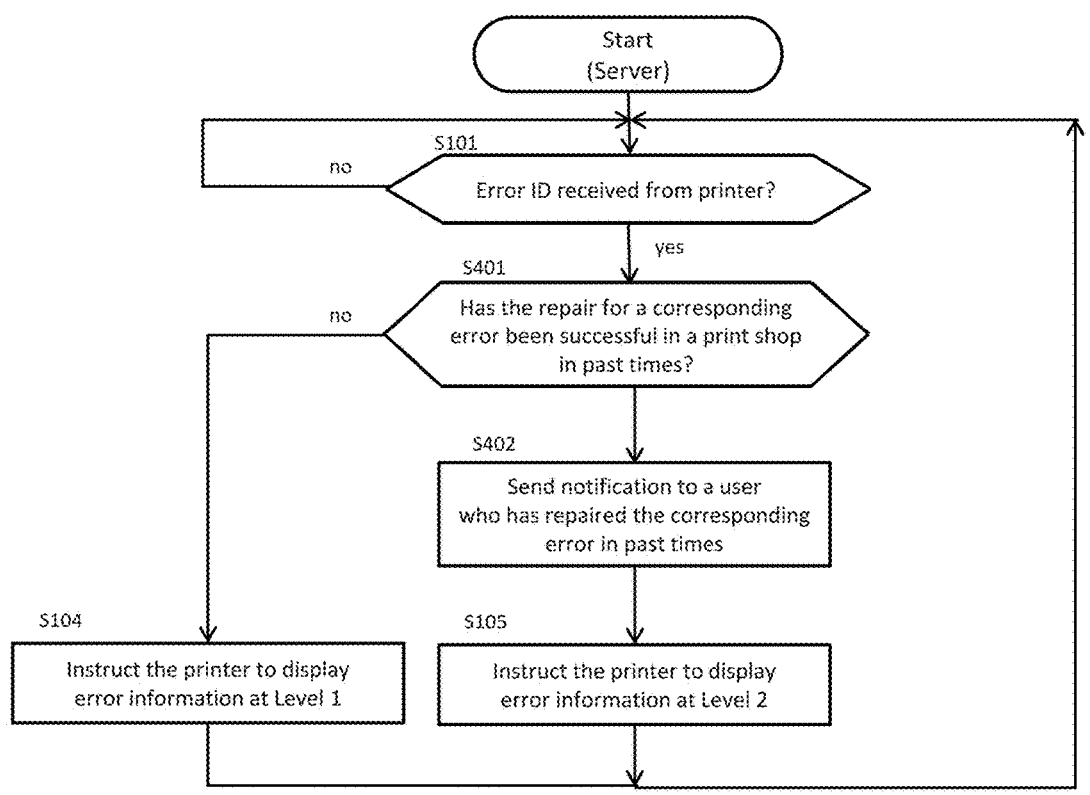
FIG. 18 is a flowchart illustrating a process for a server in accordance with an exemplary embodiment.

FIG. 18 is a flowchart illustrating a process for a server in accordance with an exemplary embodiment. As shown in FIG. 18, in step S101, if an error ID is received from the printer 20, the process continues to step S401, where a determination can be made if the repair for a corresponding error has been successful in a print shop in past, the process continues to step S402, where a notification is send to a user who has repaired the corresponding error in past times. The process then continues to step S105, where the server instructs the printer to display error information at Level 2. In step S401, if the repair for a corresponding error has not been successful in a print shop, the process continues to step S104, where the server 10 instructs the printer 20 to display error information at Level 1.

Figure 19:
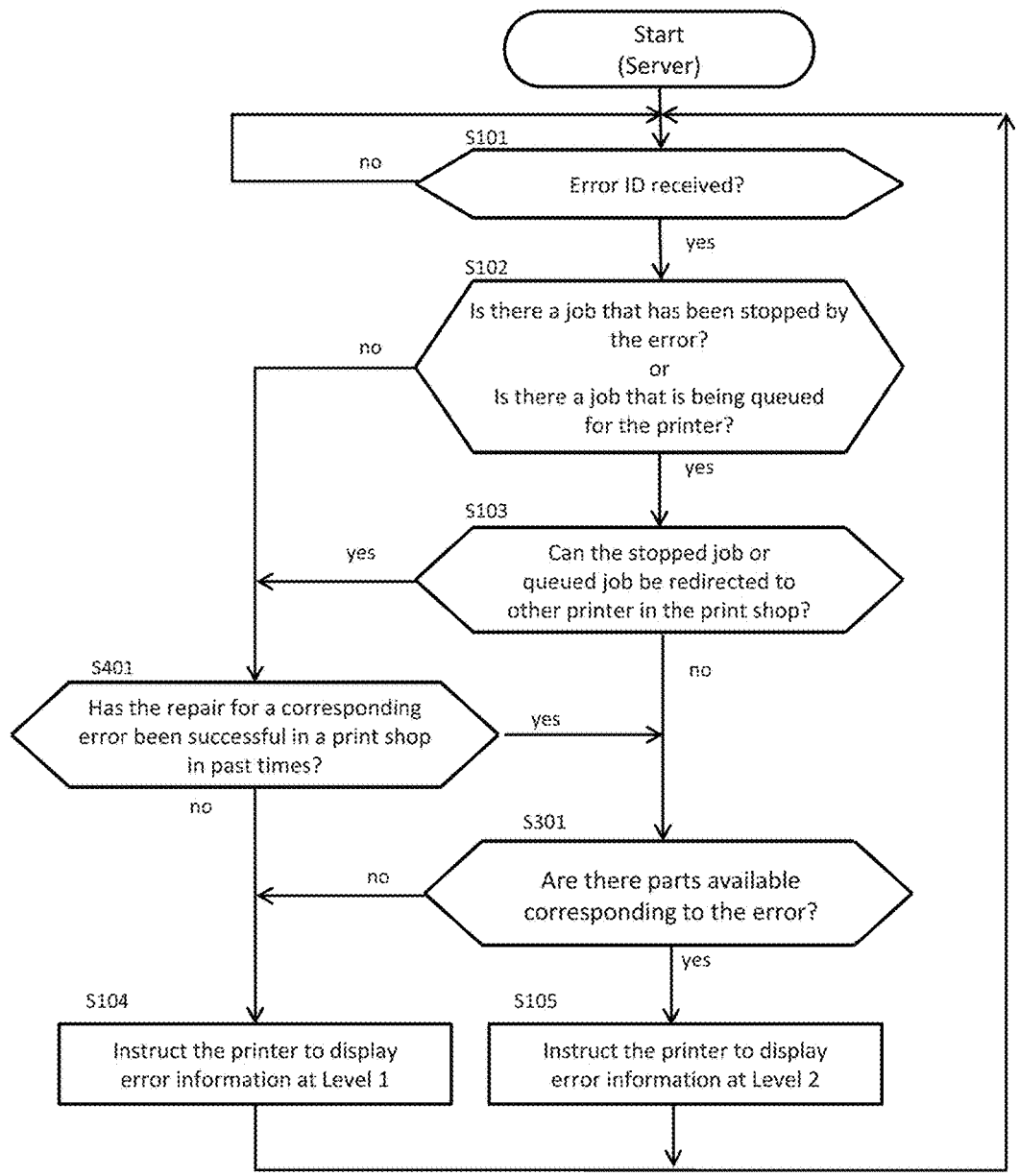
FIG. 19 is a flowchart illustrating a process for a server in accordance with an exemplary embodiment.

FIG. 19 is a flowchart illustrating a process for a server in accordance with an exemplary embodiment. As shown in FIG. 19, on the server side, once the error has been received by the server 10 at S101, a determination can be made in step S201, if there is a job that been stopped due to the error, or if there is a job that is being queued for the printer 20. In accordance with an exemplary embodiment, the server 10 determines whether there is a queued job by referring to the print queue table 2024. If there is an unfinished job (i.e., Yes), then a determination can be made in step S103, if the user can re-direct the unfinished job to another printer in the system. If the print job can be re-directed, in step S401, where a determination can be made if the repair for a corresponding error has been successful in a print shop in past. If the repair for a corresponding error has not been successful in a print shop, the process continues to step S104, where the server 10 instructs the printer 20 to display error information at Level 1.

If the print job cannot be redirected in step S103, the process continues to step S301, where a determination is made if the parts are available for the corresponding error. If the parts are available, the process continues to step S105, where the server 10 instructs the printer 20 to display error information at Level 2. If the parts are not available, the process continues to step S104, where the server 10 instructs the printer 20 to display error information at Level 1.

In accordance with an exemplary embodiment, a non-transitory computer readable recording medium stored with a computer readable program code for a server connectable to at least one printer to judge an error level is disclosed, the computer readable program code configured to execute a process comprising: (a) receiving a notification of a given error which has occurred at a given printer; (b) judging on whether there is an unfinished job corresponding to the given printer; (c) judging on whether the unfinished job can be redirected to other printer than the given printer; and (d) determining an error level for displaying the given error based on the judgment at step (c).

The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for a server connectable to at least one printer to judge an error level, the method comprising:
   (a) receiving a notification of a given error which has occurred at a given printer;
   (b) judging on whether there is an unfinished job corresponding to the given printer;
   (c) judging on whether the unfinished job can be redirected to other printer than the given printer, and redirecting the unfinished job when the other printer than the given printer can finish the job;

(d) determining an error level for displaying the given error based on the judgment at step (c) for the given printer, the error level for the displaying the given error comprises:

accessing an error table and a history table, the error table classifying the given error at a first level when there is no unfinished jobs at the given printer or the unfinished job has been redirected to the other printer than the given printer to finish the job, and at a second level when the unfinished job cannot be redirected to the other printer, and the history table containing information about a service repair history performed on the at least one printer, and providing one of the following:

instructions to repair the given error when any user can repair the given error;

identification of at least one user who previously repaired the given error from the history table; or instructions to call a service technician when the repair cannot be repaired by any user or the given error has not been previously repaired;

managing a work flow for the at least one printer and the server, wherein the server is configured to store a printing capabilities table, which describes the capabilities of each of the at least one printer to determine if a printer can accept a re-routed job;

re-routing the unfinished job when the printer can accept the re-routed job; and printing the re-routed job on the printer.

2. The method of claim 1 further comprising:

(e) judging on whether there is a part available corresponding to the given error, and wherein, in step (d), the level for displaying the given error is determined based on the judgments at steps (c) and (e), and wherein the error level is at the first level when the part is not available and at the second level when the part is available.

3. The method of claim 2 further comprising:

(f) judging on whether a repair for a corresponding error to the given error has been successful among the at least one printer, and wherein, in step (c), the level for displaying the given error is determined based on the judgments at step (c), (e), and (f).

4. The method of claim 1 further comprising:

(f) judging on whether a repair for a corresponding error to the given error has been successful among the at least one printer in past time, and wherein, in step (d), the level for displaying the given error is determined based on the judgments at steps (c) and (f), and wherein the error level is at the first level when the repair for the corresponding error to the given error has not been successful among the at least one printer in past time and at the second level when the repair for the corresponding error to the given error has been successful among the at least one printer in past time.

5. The method of claim 1, wherein the server is configured to further store one or more of the following:

the error table, the error table having a list of the at least one printer and possible errors that can happen and parts required for a repair of the error;

a print queue table, which consists of all jobs that are currently queued up for each printer of the at least one printer; and a parts supply table containing information about an inventory of parts for a print shop, which houses the given printer.

6. A server, which is configured to be connected to at least one printer, comprising:

the server comprising:

a processor configured to:

(a) receive a notification of a given error which has occurred at a given printer;

(b) judge on whether there is an unfinished job corresponding to the given printer;

(c) judge on whether the unfinished job can be redirected to other printer than the given printer, and redirect the unfinished job when the other printer than the given printer can finish the job;

(d) determine an error level for displaying the given error based on the judgment at step (c) for the given printer, the error level for the displaying the given error comprises:

accessing an error table and a history table, the error table classifying the given error at a first level when there is no unfinished jobs at the given printer or the unfinished job has been redirected to the other printer than the given printer to finish the job, and at a second level when the unfinished job cannot be redirected to the other printer, and the history table containing information about a service repair history performed on the at least one printer, and providing one of the following:

instructions to repair the given error when any user can repair the given error;

identification of at least one user who previously repaired the given error from the history table; or instructions to call a service technician when the repair cannot be repaired by any user or the given error has not been previously repaired;

managing a work flow for the at least one printer and the server, wherein the server is configured to store a printing capabilities table, which describes the capabilities of each of the at least one printer to determine if a printer can accept a re-routed job;

re-routing the unfinished job when the printer can accept the rerouted job; and printing the re-routed job on the printer.

7. The server of claim 6, wherein the processor is configured to:

(e) judge on whether there is a part available corresponding to the given error, and wherein, in step (d), the level for displaying the given error is determined based on the judgments at steps (c) and (e), and wherein the error level is at the first level when the part is not available and at the second level when the part is available.

8. The server of claim 7, wherein the processor is configured to:

(f) judge on whether a repair for a corresponding error to the given error has been successful among the at least one printer, and wherein, in step (c), the level for displaying the given error is determined based on the judgments at step (c), (e), and (f).

9. The server of claim 6, wherein the processor is configured to:

(f) judge on whether a repair for a corresponding error to the given error has been successful among the at least one printer in past time, and wherein, in step (d), the level for displaying the given error is determined based on the judgments at steps (c) and (f), and wherein the error level is at the first level when the repair for the corresponding error to the given error has not been successful among the at least one printer in past time and at the second level when the repair for the corresponding error to the given error has been successful among the at least one printer in past time.

10. The server of claim 6, wherein the server is configured to further store one or more of the following:
  the error table, the error table having a list of the at least one printer and possible errors that can happen and parts required for a repair of the error;
  a print queue table, which consists of all jobs that are currently queued up for each printer of the at least one printer; and
  a parts supply table containing information about an inventory of parts for a print shop, which houses the given printer.

11. A system for judging an error level on a printer, the system comprising:
  a server which is configured to be connected to at least one printer, the server having a processor configured to:
  (a) receive a notification of a given error which has occurred at a given printer;
  (b) judge on whether there is an unfinished job corresponding to the given printer;
  (c) judge on whether the unfinished job can be redirected to other printer than the given printer, and redirect the unfinished job when the other printer than the given printer can finish the job;
  (d) determine an error level for displaying the given error based on the judgment at step (c) for the given printer;
  manage a work flow for the at least one printer and the server, wherein the server is configured to store a printing capabilities table, which describes the capabilities of each of the at least one printer to determine if a printer can accept a re-routed job;
  re-route the unfinished job when the printer can accept the re-routed job; and
  print the re-routed job on the printer; and
  at least one printer, each of the at least one printer configured to:
  generate the notification of the given error;
  send an error identifier (ID) to the server;
  receive an instruction from the server for the displaying of the given error; and
  display the error information based on the instruction received from the server, the error level for the displaying the given error comprises:
  accessing an error table and a history table, the error table classifying the given error at a first level when there is no unfinished jobs at the given printer or the unfinished job has been redirected to the other printer than the given printer to finish the job, and at a second level when the unfinished job cannot be redirected to the other printer, and the history table containing information about a service repair history performed on the at least one printer, and providing one of the following:
  instructions to repair the given error when any user can repair the given error;
  identification of at least one user who previously repaired the given error from the history table; or
  instructions to call a service technician when the repair cannot be repaired by any user or the given error has not been previously repaired.

12. The system of claim 11, wherein the processor of the server is configured to:
  (e) judge on whether there is a part available corresponding to the given error, and wherein, in step (d), the level for displaying the given error is determined based on the judgments at steps (c) and (e), and wherein the error level is at the first level when the part is not available and at the second level when the part is available.

13. The system of claim 12, wherein the processor is configured to:
  (f) judge on whether a repair for a corresponding error to the given error has been successful among the at least one printer, and
  wherein, in step (c), the level for displaying the given error is determined based on the judgments at step (c), (e), and (f).

14. The system of claim 11, wherein the processor of the server is configured to:
  (f) judge on whether a repair for a corresponding error to the given error has been successful among the at least one printer in past time, and
  wherein, in step (d), the level for displaying the given error is determined based on the judgments at steps (c) and (f), and wherein the error level is at the first level when the repair for the corresponding error to the given error has not been successful among the at least one printer in past time and at the second level when the repair for the corresponding error to the given error has been successful among the at least one printer in past time.

15. The system of claim 11, wherein the workflow of the system is managed by the server, and wherein the server is configured to further store one or more of the following:
  the error table, the error table having a list of the at least one printer and possible errors that can happen and parts required for a repair of the error;
  a print queue table, which consists of all jobs that are currently queued up for each printer of the at least one printer;
  a parts supply table containing information about an inventory of parts for a print shop, which houses the given printer.

16. The system of claim 11, wherein each of the at least one printer has a reference table of errors, and the table of errors having a corresponding error ID, which is sent to the server.

17. The system of claim 11, comprising:
  one or more client devices configured to send jobs to one or more of the at least one printer.

18. A non-transitory computer readable recording medium stored with a computer readable program code for a server connectable to at least one printer to judge an error level, the computer readable program code configured to execute a process comprising:
  (a) receiving a notification of a given error which has occurred at a given printer;
  (b) judging on whether there is an unfinished job corresponding to the given printer;
  (c) judging on whether the unfinished job can be redirected to other printer than the given printer, and redirect the unfinished job when the other printer than the given printer can finish the job; and
  (d) determining an error level for displaying the given error based on the judgment at step (c) for the given printer, the error level for the displaying the given error comprises:
  accessing an error table and a history table, the error table classifying the given error at a first level when there is no unfinished jobs at the given printer or the unfinished job has been redirected to the other printer than the given printer to finish the job, and at a second level when the unfinished job cannot be redirected to the other printer, and the history table containing information about a service repair history performed on the at least one printer, and providing one of the following:

instructions to repair the given error when any user can repair the given error;

identification of at least one user who previously repaired the given error from the history table; or instructions to call a service technician when the repair cannot be repaired by any user or the given error has not been previously repaired;

managing a work flow for the at least one printer and the server, wherein the server is configured to store a printing capabilities table, which describes the capabilities of each of the at least one printer to determine if a printer can accept a re-routed job;

re-routing the unfinished job when the printer can accept the re-routed job; and printing the re-routed job on the printer.

19. The computer readable recording medium of claim 18, further comprising:

(e) judging on whether there is a part available corresponding to the given error, and wherein, in step (d), the level for displaying the given error is determined based on the judgments at steps (c) and (e)), and wherein the error level is at the first level when the part is not available and at the second level when the part is available; and (f) judging on whether a repair for a corresponding error to the given error has been successful among the at least one printer in past time, and wherein, in step (d), the level for displaying the given error is determined based on the judgments at steps (c) and (f), and wherein the error level is at the first level when the repair for the corresponding error to the given error has not been successful among the at least one printer in past time and at the second level when the repair for the corresponding error to the given error has been successful among the at least one printer in past time, or wherein, in step (c), the level for displaying the given error is determined based on the judgments at step (c), (e), and (f).

20. The computer readable recording medium of claim 18, wherein the server is configured to further store one or more of the following:

the error table, the error table having a list of the at least one printer and possible errors that can happen and parts required for a repair of the error;

a print queue table, which consists of all jobs that are currently queued up for each printer of the at least one printer; and a parts supply table containing information about an inventory of parts for a print shop, which houses the given printer.

* * * * *